US011181142B2

(12) United States Patent
Horng et al.

(10) Patent No.: US 11,181,142 B2
(45) Date of Patent: Nov. 23, 2021

(54) BEARING SYSTEM

(71) Applicant: Sunonwealth Electric Machine Industry Co., Ltd., Kaohsiung (TW)

(72) Inventors: Alex Horng, Kaohsiung (TW); Ko-Chien Wang, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 16/983,723

(22) Filed: Aug. 3, 2020

(65) Prior Publication Data

US 2021/0062865 A1    Mar. 4, 2021

(30) Foreign Application Priority Data

Aug. 27, 2019  (TW) ................................. 108130660

(51) Int. Cl.
*F16C 17/04* (2006.01)
*F16C 33/10* (2006.01)
*F16C 33/74* (2006.01)

(52) U.S. Cl.
CPC .......... *F16C 17/045* (2013.01); *F16C 33/107* (2013.01); *F16C 33/74* (2013.01)

(58) Field of Classification Search
CPC .... F16C 17/045; F16C 17/102; F16C 17/107; F16C 33/107; F16C 33/74; F16C 33/745
See application file for complete search history.

(56) References Cited

U.S. PATENT DOCUMENTS

| 6,361,216 | B1 | 3/2002 | Takahashi et al. |
| 7,524,113 | B2 | 4/2009 | Haga et al. |
| 9,613,651 | B1* | 4/2017 | Mizukami .......... G11B 19/2036 |
| 2004/0114840 | A1* | 6/2004 | Gomyo .............. G11B 19/2018 384/107 |
| 2005/0025405 | A1 | 2/2005 | Tamaoka |
| 2005/0074191 | A1* | 4/2005 | Braun .................... F16C 17/107 384/100 |
| 2005/0111766 | A1* | 5/2005 | Gotoh .................... F16C 33/107 384/100 |
| 2007/0025652 | A1 | 2/2007 | Satoji et al. |
| 2007/0177832 | A1* | 8/2007 | Gotoh .................... H02K 7/085 384/107 |

(Continued)

FOREIGN PATENT DOCUMENTS

| CN | 203822684 U | 9/2014 |
| CN | 108869532 A | 11/2018 |

(Continued)

*Primary Examiner* — Alan B Waits
(74) *Attorney, Agent, or Firm* — Karin L. Williams; Alan D. Kamrath; Mayer & Williams PC

(57) ABSTRACT

A bearing system includes a first bearing, a second bearing, and a rotating member. The first bearing is hollow and has a first inner face. The second bearing is located in the first bearing. The second bearing includes a second inner face axially aligned with the first inner face. A partitioning space is formed between the first inner face and the second inner face. The rotating member has a shaft and a protruding portion coupled to the shaft. The protruding portion is located in the partitioning space. A dynamic pressure gap is formed between the protruding portion and the first inner face during rotation. Another dynamic pressure gap is formed between the protruding portion and the second inner face during rotation.

26 Claims, 10 Drawing Sheets

(56) References Cited

U.S. PATENT DOCUMENTS

| | | | | |
|---|---|---|---|---|
| 2008/0011551 A1* | 1/2008 | Inazuka | ............. | B29C 45/0055 |
| | | | | 184/54 |
| 2012/0008888 A1* | 1/2012 | Niwa | ................. | B29C 45/0005 |
| | | | | 384/107 |
| 2017/0102031 A1* | 4/2017 | Potze | ...................... | F16C 43/02 |
| 2017/0343042 A1* | 11/2017 | Kato | ..................... | F16C 17/107 |
| 2020/0182299 A1* | 6/2020 | Kimura | ................ | F16J 15/3424 |
| 2020/0408249 A1* | 12/2020 | Komatsubara | ............ | B22F 3/24 |

FOREIGN PATENT DOCUMENTS

| | | |
|---|---|---|
| JP | H10269691 A | 10/1998 |
| JP | 2001020945 A | 1/2001 |
| JP | 2004144284 A | 5/2004 |
| JP | 2007092799 A | 4/2007 |
| JP | 2010053906 A | 3/2010 |
| JP | 2013128371 A | 6/2013 |
| TW | 201840385 A | 11/2018 |
| WO | WO2004092600 A1 | 10/2004 |

\* cited by examiner

BEARING SYSTEM

The application claims the benefit of Taiwan application serial No. 108130660, filed on Aug. 27, 2019, and the entire contents of which are incorporated herein by reference.

BACKGROUND OF THE INVENTION

1. Field of the Invention

The present invention relates to a component of a motor or a fan and, more particularly, to a bearing system that can be mounted in a motor or a fan.

2. Description of the Related Art

FIG. 1 shows a conventional fan 9 including a shaft seat 91, a bearing system 92, a rotor 93, and a stator 94. The bearing system 92 has a shaft tube 921 coupled to the shaft seat 91, an oil bearing 922 mounted in the shaft tube 921, a sealing cap 923 closing a bottom of the shaft tube 921, and a wear pad 924 mounted in the sealing cap 923. The rotor 93 has a shaft 931 extending through the oil bearing 922. A bottom end of the shaft 931 abuts against the wear pad 924. A retaining piece 932 is mounted to an outer periphery of the shaft 931 and is located below the oil bearing 922. A hub 933 is coupled to a top end of the shaft 931 and has an outer periphery connected to a plurality of blades 934. A magnetic member 935 is coupled to an inner periphery of the hub 933. The stator 94 is coupled to an outer periphery of the shaft tube 921 and is radially aligned with the magnetic member 935 for driving the rotor 93 to rotate. An example of such a conventional fan 9 is disclosed in Taiwan Utility Model No. M247713.

During operation of the above conventional fan 9, in a case that the shaft 931 floats upwards, the retaining piece 932 will be stopped by the bottom end of the oil bearing 922 to restrain the axial movement of the shaft 931. However, the retaining piece 932 will repeatedly impact the bottom end of the oil bearing 922 and, thus, causes unstable rotation due to vibrations while generating noise.

In light of this, it is necessary to improve the bearing system of the conventional fan.

SUMMARY OF THE INVENTION

It is therefore an objective of the present invention to provide a bearing system capable of limiting axial movement of a shaft while significantly reducing impact to an axial end of a bearing from the shaft.

It is another objective of the present invention to provide a bearing system including a shaft having a bottom remaining in an elevated state without rubbing other components.

It is a further objective of the present invention to provide a bearing system capable of generating a more uniform oil film between a shaft and a bearing.

It is yet a further objective of the present invention to provide a bearing system capable of simplifying the components required for assembly, thereby increasing the assembling convenience and efficiency.

As used herein, the term "a" or "an" for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

As used herein, the term "coupling", "engagement", "assembly", or similar terms is used to include separation of connected members without destroying the members after connection or inseparable connection of the members after connection. A person having ordinary skill in the art would be able to select, according to desired demands, the material or assembly of the members to be connected.

A bearing system according to the present invention includes a first bearing, a second bearing, and a rotating member. The first bearing is hollow and has a first inner face. The second bearing is located in the first bearing. The second bearing includes a second inner face axially aligned with the first inner face. A partitioning space is formed between the first inner face and the second inner face. The rotating member includes a shaft and a protruding portion coupled to the shaft. The protruding portion is located in the partitioning space. A dynamic pressure gap is formed between the protruding portion and the first inner face during rotation. Another dynamic pressure gap is formed between the protruding portion and the second inner face during rotation.

Thus, in the bearing system according to the present invention, when the rotating member rotates, an oil film can be generated between the protruding portion and each of the first and second bearings. The oil films not only maintain smooth rotation of the shaft but also prevent axial displacement of the shaft as well as preventing the protruding portion from impacting the first and second bearings to thereby avoid operational noise and vibrations. The quality of a fan or a motor equipped with the bearing system can, thus, be improved.

In an example, the bearing system further includes a supporting portion located between the first inner face and the second inner face. The partitioning space is formed between the first inner face, the second inner face, and an inner periphery of the supporting portion. Thus, the supporting portion can precisely control the size of the partitioning space, increasing the assembling convenience and the product yield.

In an example, the shaft extends through an axial hole of the second bearing. The first bearing includes an annular wall connected to an axial end. The first inner face is located on the axial end and faces the axial hole. The supporting portion is integrally connected to one of the first and second inner faces and abuts against another of the first and second inner faces. Thus, when the second bearing is being mounted into the first bearing, the second bearing can be pressed until the supporting portion abuts against the first inner face or the second inner face to assure that the partitioning space conforms to the predetermined size, and the components required to be assembled are few, increasing the assembling convenience and efficiency.

In an example, the shaft has an outer diameter smaller than a hole diameter of the axial hole of the second bearing. Thus, the rotational smoothness of the shaft is increased.

In an example, the first inner face of the first bearing is recessed to form a compartment intercommunicating with the partitioning space. The shaft has a bottom portion extending into the compartment and remaining in an elevated position not contacting with a bottom face of the compartment. Thus, the shaft will not rub the bottom face of the compartment during rotation. This increases the rotational smoothness of the shaft, reduces the operational noise, and prolongs the service life of the bearing system.

In an example, the outer diameter of the shaft is smaller than a diametric width of the compartment. Thus, the rotational smoothness of the shaft is increased.

In an example, the first bearing includes an annular wall connected to an axial end. The first inner face is located on the axial end. The axial end has an axial hole extending through the first inner face. The shaft extends through the axial hole of the axial end. The supporting portion is integrally connected to one of the first and second inner faces and abuts against another of the first and second inner faces. Thus, when the second bearing is being mounted into the first bearing, the second bearing can be pressed until the supporting portion abuts against the first inner face or the second inner face to assure that the partitioning space conforms to the predetermined size, and the components required to be assembled are few, increasing the assembling convenience and efficiency.

In an example, the shaft has an outer diameter smaller than a hole diameter of the axial hole of the axial end. Thus, the rotational smoothness of the shaft is increased.

In an example, the second inner face of the second bearing is recessed to form a compartment intercommunicating with the partitioning space. The shaft has a bottom portion extending into the compartment and remaining in an elevated position not contacting with a bottom face of the compartment. Thus, the shaft will not rub the bottom face of the compartment during rotation. This increases the rotational smoothness of the shaft, reduces the operational noise, and prolongs the service life of the bearing system.

In an example, the outer diameter of the shaft is smaller than a diametric width of the compartment. Thus, the rotational smoothness of the shaft is increased.

In an example, a bottom end of the shaft is flush with a bottom end of the protruding portion. Thus, the structure is simplified to permit easy manufacture.

In an example, the shaft includes an outer periphery, an outer end face, and an inner end face. The protruding portion is located between the outer end face and the inner end face of the shaft. Thus, the rotational stability of the rotating member is increased.

In an example, the first bearing includes an annular wall, and the second bearing is press-fitted to the annular wall of the first bearing. Thus, the coupling reliability is increased.

In an example, the first bearing includes an annular wall, and the second bearing is coupled to the annular wall by laser welding. Thus, the coupling reliability is increased.

In an example, the protruding portion is integrally formed with an outer periphery of the shaft and extends radially outwards from the outer periphery of the shaft. Thus, the position of the protruding portion on the outer periphery of the shaft can be fixed to reduce the assembling error or subsequent relative displacement that would adversely affects the effect of forming the oil film, increasing the operational stability of the bearing system.

In an example, the protruding portion is coupled to an outer periphery of the shaft and extends radially outwards from the outer periphery of the shaft. Thus, the manufacturing convenience and the assembly convenience are increased.

In an example, the protruding portion is coupled to outer periphery of the shaft by laser welding. Thus, the coupling reliability is increased.

In an example, the first bearing and the second bearing are made of phosphor bronze alloy. Thus, the first bearing and the second bearing will have sufficient structural strength to directly couple with a base of a fan without leakage of the lubricating oil, simplifying the components and increasing the assembling convenience and assembly.

In an example, the protruding portion is in a form of a disc and encircles an outer periphery of the shaft. Thus, the oil film generated between the protruding portion and the first and second bearings can be more uniform, increasing the rotational smoothness of the shaft.

In an example, the protruding portion includes a first axial face aligned with the first inner face of the first bearing. At least one of the first inner face and the first axial face is recessed to form a plurality of first dynamic pressure grooves. The protruding portion includes a second axial face aligned with the second inner face of the second bearing. At least one of the second inner face and the second axial face is recessed to form a plurality of second dynamic pressure grooves. Thus, the dynamic pressure effect created during operation of the bearing system can be further improved.

In an example, the bearing system further includes at least one annular grooves surrounding and intercommunicating with at least one of the plurality of first dynamic pressure grooves and the plurality of second dynamic pressure grooves. Thus, the circling smoothness of the lubricating oil is increased.

In an example, the second bearing includes an outer face located axially away from the second inner face. A ring member is coupled to the first bearing and covers an outer face of the second bearing. Thus, leakage of the lubricating oil is avoided, and an auxiliary securing effect is provided for the second bearing.

In an example, the ring member includes a shielding disc having a through hole. The shaft extends through the through hole of the shielding disc and an axial hole of the second bearing. The through hole has a diametric width larger than a hole diameter of the axial hole of the second bearing. Thus, the shaft is prevented from rubbing the ring member, avoiding adversely affecting on the rotational smoothness of the shaft.

In an example, the second bearing includes a first inclined guiding face connected to the axial hole and the outer face of the second bearing. The diametric width of the through hole is smaller than a diametric width of a connection area between the first inclined guiding face and the outer face. Thus, the ring member can stop the lubricating oil from flowing outwards along the first inclined guiding face, preventing leakage of the lubricating oil.

In an example, the shaft includes an annular groove radially aligned with the shielding disc. Thus, the lubricating oil can flow into the annular groove and then flow back into the first bearing due to the gravity, avoiding loss of the lubricating oil along the shaft.

In an example, the shielding disc includes an inclined face contiguous to the through hole and facing the second bearing. An oil cutoff space is formed between the inclined face and the outer face of the second bearing. Thus, the lubricating oil flowing along the first inclined guiding face to an upper end of the second bearing can continuously flow into the oil cutoff space. Thus, the lubricating oil is less likely to flow outwards via the through hole, preventing leakage of the lubricating oil.

In an example, the ring member includes an insertion portion connected to an outer periphery of the shielding disc. The insertion portion extends between the first bearing and the second bearing. The insertion portion is coupled with the first bearing. Thus, the ring member can be securely coupled to the first bearing and can assist in positioning of the second bearing, increasing the coupling stability.

In an example, the shaft includes an inner end face located in the first bearing. A stub protrudes from the inner end face. The protruding portion is coupled to the stub. The stub has a height larger than a thickness of the protruding portion. An oil receiving space is formed between the protruding portion and the inner end face. Thus, the lubricating oil in the oil receiving space can be smoothly replenished into the dynamic pressure gap between the protruding portion and the second inner face of the second bearing, increasing the rotational smoothness and reducing the operational noise and vibrations.

In an example, the second bearing includes a second inclined guiding face connected to the axial hole and the second inner face. The inner end face of the shaft is radially aligned with the second inclined guiding face. Thus, the above lubricating oil replenishing operation can be smoother.

The present invention will become clearer in light of the following detailed description of illustrative embodiments of this invention described in connection with the drawings.

Figure 1:
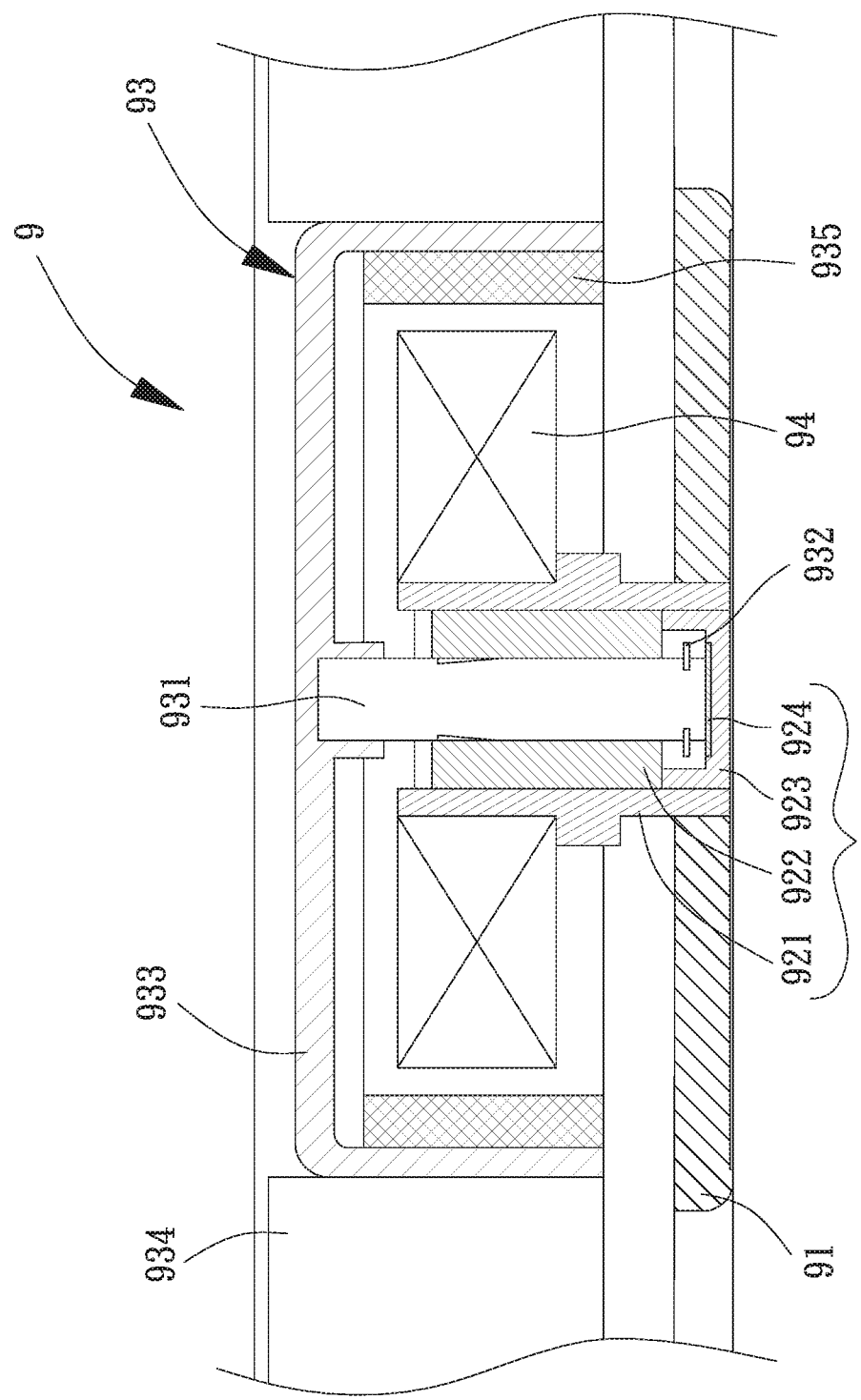
FIG. 1 is a cross sectional view of a conventional fan.

In the various figures of the drawings, the same numerals designate the same or similar parts. Furthermore, when the terms "front", "rear", "left", "right", "up", "down", "top", "bottom", "inner", "outer", "side", and similar terms are used herein, it should be understood that these terms have reference only to the structure shown in the drawings as it would appear to a person viewing the drawings and are utilized only to facilitate describing the invention, rather than restricting the invention.

DETAILED DESCRIPTION OF THE INVENTION

Figure 2:
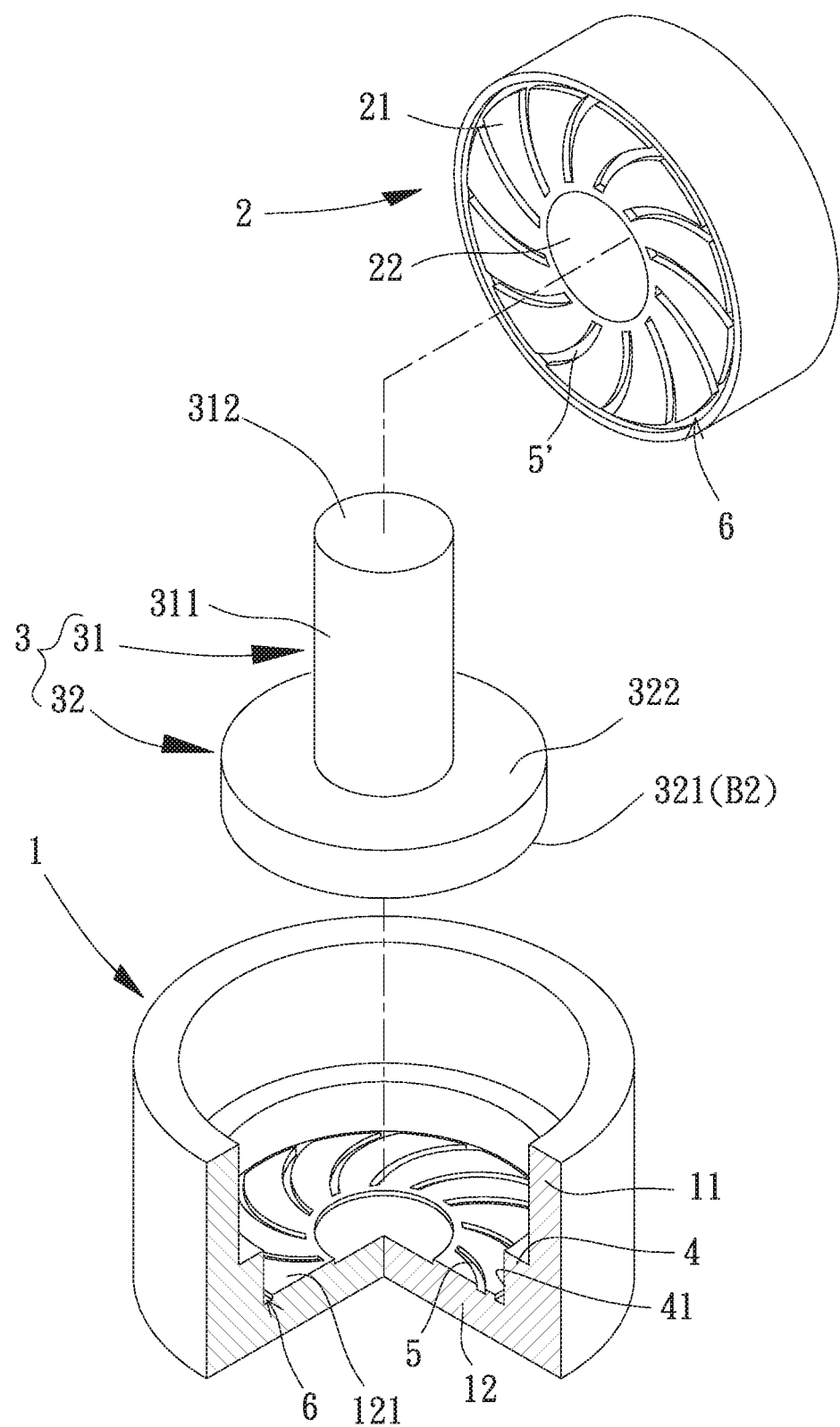
FIG. 2 is an exploded, perspective view of a bearing system of a first embodiment according to the present invention.
Figure 3:
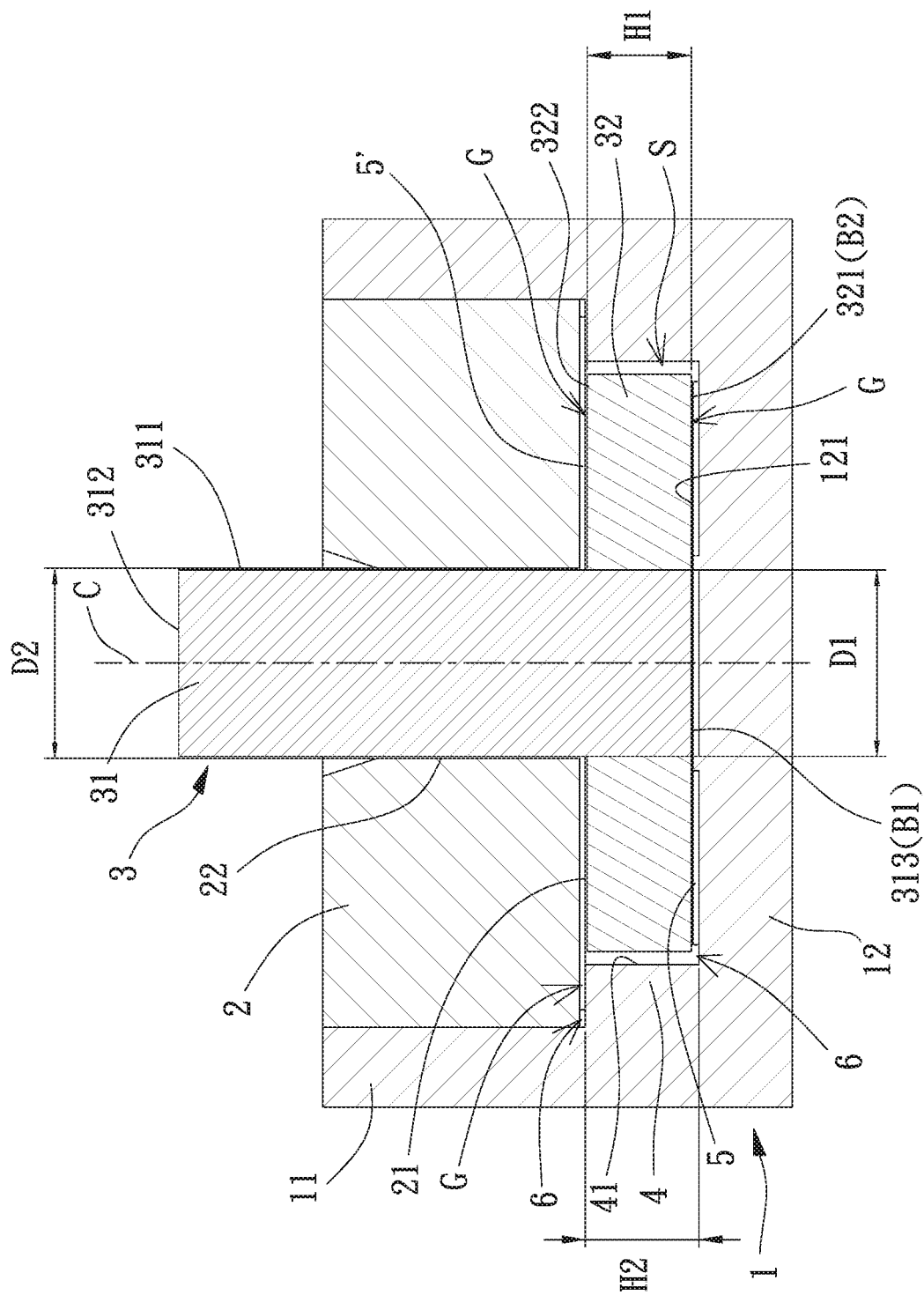
FIG. 3 is a cross sectional view of the bearing system of the first embodiment according to the present invention.

With reference to FIGS. 2 and 3, a bearing system of a first embodiment according to the present invention includes a first bearing 1, a second bearing 2, and a rotating member 3. The second bearing 2 is located in the first bearing 1. The rotating member 3 can rotate relative to the first bearing 1 and the second bearing 2.

The first bearing 1 includes an annular wall 11 connected to an axial end 12, such that the first bearing 1 is substantially in the form of a cup for receiving the second bearing 2. In this embodiment, the axial end 12 is located on a bottom side of the annular wall 11 and is integrally formed with the annular wall 11, such that a bottom end of the first bearing 1 can be completely closed to effectively avoid leakage of a lubricating oil in the first bearing 1. The axial end 12 has a first inner face 121 facing a top end of the annular wall 11.

The second bearing 2 is received in the first bearing 1 and has a second inner face 21 axially aligned with the first inner face 121. A partitioning space S is formed between the first inner face 121 and the second inner face 21. The second bearing 2 can be press-fitted to the annular wall 11 of the first bearing 1. Preferably, the second bearing 2 and the annular wall 11 can be coupled by laser welding. Furthermore, the bearing system of this embodiment can further include a supporting portion 4 located between the first inner face 121 and the second inner face 21 for separating the first inner face 121 from the second inner face 21. Thus, after the second bearing 2 is mounted into the first bearing 1, the second inner face 21 is spaced from the first inner face 121 by a predetermined spacing, achieving assembling convenience and precisely controlling the size of the partitioning space S.

Specifically, the supporting portion 4 can be integrally connected to and protruding from the first inner face 121. When assembling the second bearing 2, the second bearing 2 is pressed until the second inner face 21 abuts against the supporting portion 4 to thereby limit the coupling depth of the second bearing 2. Furthermore, the first inner face 121, the second inner face 21, and an inner periphery 41 of the supporting portion 4 together form the partitioning space S while assuring that the partitioning space S conforms to a predetermined size. Furthermore, the components required to be assembled are few and can, thus, be assembled rapidly. In an alternative embodiment, a reverse arrangement can be provided, such that the supporting portion 4 is integrally connected to the second inner face 21, and the supporting portion 4 abuts against the first inner face 21 when assembling the second bearing 2. Alternatively, the supporting portion 4 can be separated into two parts. One of the two parts is integrally connected to the first inner face 121, and another of the two parts is integrally connected to the second inner face 21. The two parts abut against each other during assembly to achieve the above effect.

Furthermore, the second bearing 2 of this embodiment includes an axial hole 22 in the form of a through hole, such that the partitioning space S can intercommunicate with the outside via the axial hole 22. The axial hole 22 extends through the second inner face 21 and faces the first inner face 121. Preferably, at least a portion of the axial hole 22 gradually widens upwards in the axial direction, such that the lubricating oil inadvertently overflowing to the axial hole 22 is less likely to keep leaking outwards.

The rotating member 3 has a shaft 31 that can be driven to rotate. The shaft 31 includes an outer periphery 311, an outer end face 312, and an inner end face 313. The shaft 31 extends through the axial hole 22 of the second bearing 2. The outer end face 312 of the shaft 31 is located outside of the first bearing 1. The inner end face 313 of the shaft 31 is located in the first bearing 1. Preferably, the shaft 31 has an outer diameter D1 slightly smaller than a hole diameter D2 of the axial hole 22 of the second bearing 2 to increase the rotational smoothness of the shaft 31. The rotating member 3 includes a protruding portion 32 coupled to the shaft 31 and located in the partitioning space S. The shaft 31 can drive the protruding portion 32 to rotate synchronously. In this embodiment, the protruding portion 32 is coupled to the outer periphery 311 of the shaft 31, substantially extends radially outwards from the outer periphery 311 of the shaft 31, and is disposed in the partitioning space S, such that the protruding portion 32 has a first axial face 321 and a second axial face 322 aligned with the first axial face 321. The first axial face 321 is aligned with the first inner face 121 of the first bearing 1. The second axial face 322 is aligned with the second inner face 21 of the second bearing 2. The type of the protruding portion 32 is not limited in the present invention. An axial height H1 of the protruding portion 32 is smaller than an axial height H2 of the partitioning space S for that, during rotation, a dynamic pressure gap G can be formed between the protruding portion 32 and the first inner face 121, and another dynamic gap G can be formed between the protruding portion 32 and the second inner face 21, respectively. In this embodiment, the protruding portion 32 can be in the form of a disc to completely encircle the outer periphery 311 of the shaft 31.

Figure 7:
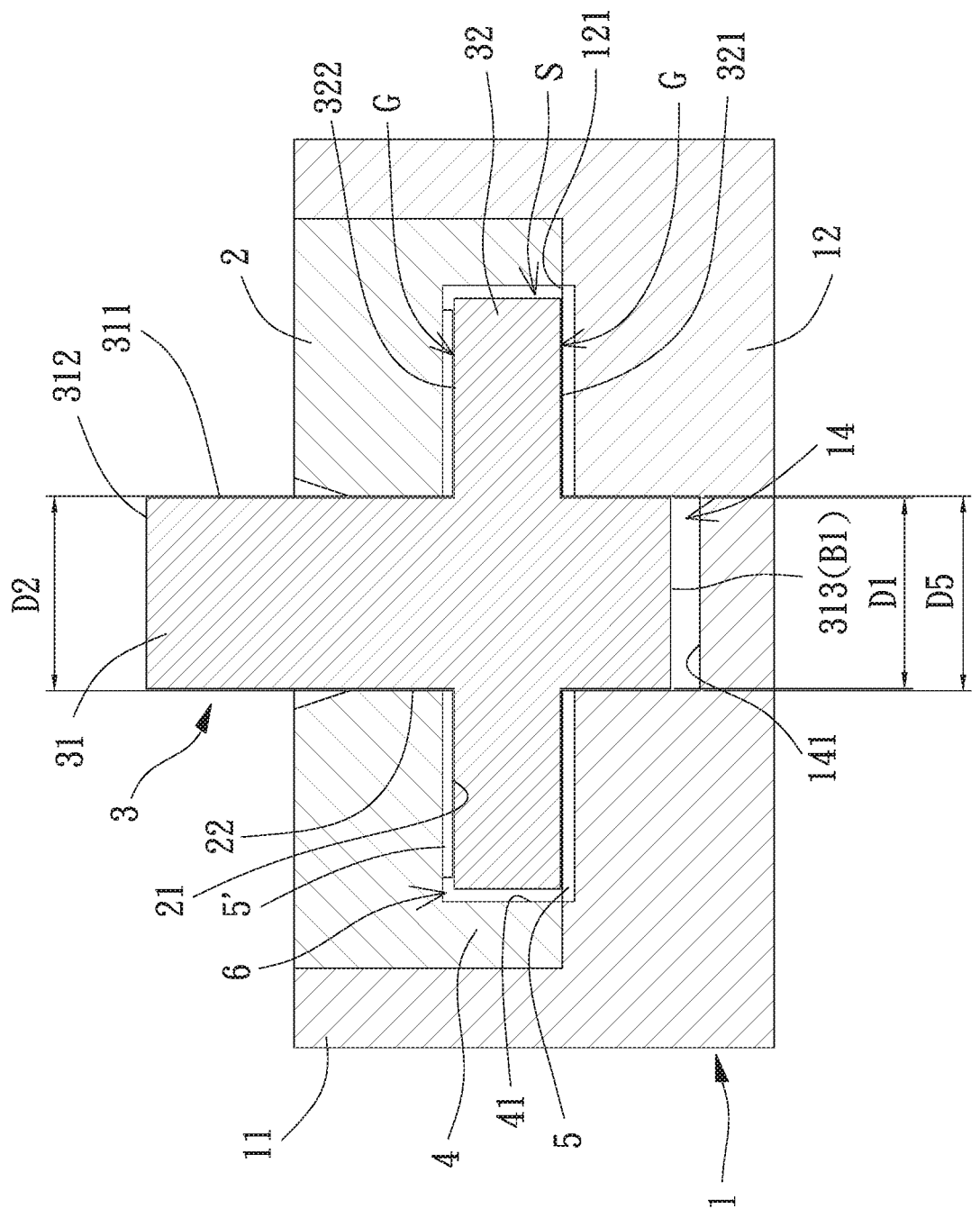
FIG. 7 is a cross sectional view of a bearing system of a third embodiment according to the present invention.

In an embodiment having the supporting portion 4, the protruding portion 32 should be spaced from the inner periphery 41 of the supporting portion 4 to avoid contact therebetween, avoiding adversely affecting on the rotational smoothness of the rotating member 3. Furthermore, the protruding portion 32 can be integrally formed with the outer periphery 311 of the shaft 31 (as shown in FIG. 7) or coupled to the outer periphery 311 of the shaft 31 by laser welding, press-fitting, etc. The present invention is not limited in this regard. Furthermore, the rotating member 3 of this embodiment can be so configured that a bottom portion B1 of the shaft 31 is flush with a bottom end B2 of the protruding portion 32. Namely, the inner end face 313 of the shaft 31 can be coplanar with the first axial face 321 of the protruding portion 32, such that the rotating member 3 is substantially inverted T-shaped in cross section.

To further increase the dynamic pressure effect generated during operation of the bearing system, at least one of the first inner face 121 and the first axial face 321 is recessed to form a plurality of first dynamic pressure grooves 5, and at least one of the second inner face 21 and the second axial face 322 is recessed to form a plurality of second dynamic pressure grooves 5'. In this non-restrictive example, the first inner face 121 of the first bearing 1 has the plurality of first dynamic pressure grooves 5, and the second inner face 21 of the second bearing 2 has the plurality of second dynamic pressure grooves 5'.

Specifically, the plurality of first or second dynamic pressure grooves 5 or 5' on the same face can be distributed around a rotating axis C of the shaft 31 in a radiant pattern or can extend along tangents of a reference circle. The plurality of first or second dynamic pressure grooves 5 or 5' on the same face can be arcuate in the same direction and each has a depth of about 0.02-0.04 mm. Preferably, the first bearing 1 of the bearing system further includes an annular groove 6 surrounding and intercommunicating with the plurality of first dynamic pressure grooves 5 to increase the circling smoothness of the lubricating oil. The plurality of second dynamic pressure grooves 5' on the second inner face 21 intercommunicates or does not intercommunicate with the axial hole 22. Furthermore, another annular groove 6 can be formed on the second inner face 21 and can surround and intercommunicate with the plurality of second dynamic pressure grooves 5'.

According to the above structure, when the bearing system is applied in a fan, the first bearing 1 is coupled to a fan frame, a stator is disposed around the first bearing 1, and an impeller is coupled to the shaft 31 of the rotating member 3. During operation of the fan, the stator drives the impeller to rotate, thereby driving the rotating member 3 to rotate relative to the first bearing 1 and the second bearing 2. During rotation of the rotating member 3, the lubricating oil in the dynamic pressure gap G between the protruding portion 32 and the first inner face 121 generates an oil film, and the lubricating oil in the dynamic pressure gap G between the protruding portion 32 and the second inner face 21 generates another oil film, maintaining smooth rotation of the rotating member 3 whereas the two oil films prevent the protruding portion 32 from impacting the first bearing 1 or the second bearing 2. Thus, during operation of the bearing system of this embodiment, noise and vibrations resulting from impact to the first bearing 1 or second bearing 2 are less likely to occur. Furthermore, both the dynamic pressure generated between the protruding portion 32 and the first inner face 121 and the dynamic pressure generated between the protruding portion 32 and the second inner face 21 can inhibit the axial displacement of the shaft 31.

It is worth mentioning that the first bearing 1 and the second bearing 2 can be made of phosphor bronze alloy to provide a sufficient structural strength. Furthermore, as compared to oil bearings (also known as porous bearings) obtained from sintering metal powders, phosphor bronze alloy bearings are dense enough to avoid leakage of the lubricating oil resulting from outward flow of the lubricating oil due to capillary phenomenon. Thus, the bearing system according to the present invention can be directly coupled to a base of the fan without the need of a rigid leakproof bushing around the first bearing 1 and the second bearing 2, thereby simplifying the components and increasing the assembling convenience and efficiency.

Figure 4:
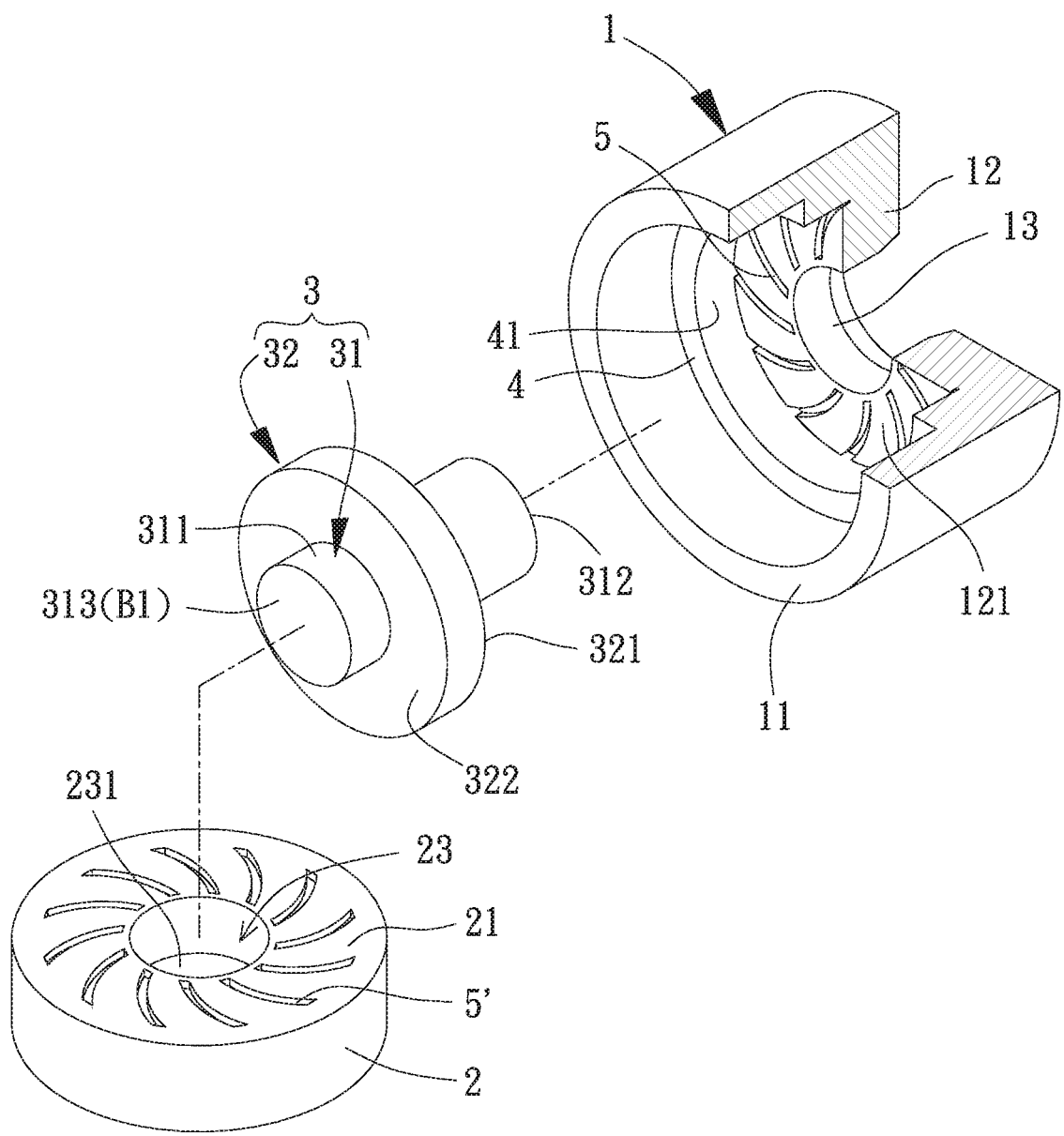
FIG. 4 is an exploded, perspective view of a bearing system of a second embodiment according to the present invention.
Figure 5:
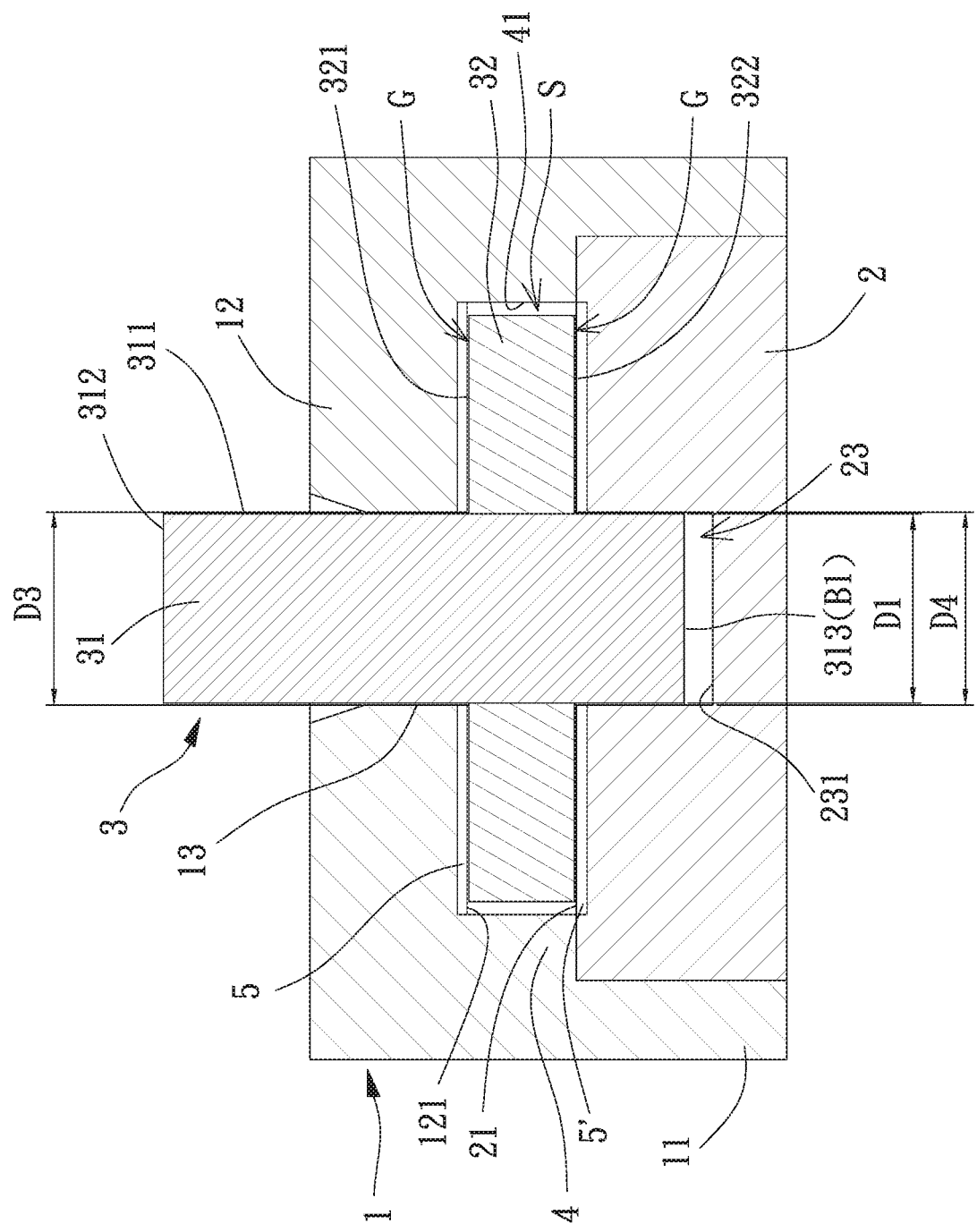
FIG. 5 is a cross sectional view of the bearing system of the second embodiment according to the present invention.

With reference to FIGS. 4 and 5 showing a bearing system of a second embodiment according to the present invention, the axial end 12 of the first bearing 1 can be located on the top end of the annular wall 11 in this embodiment, such that the first bearing 1 has an open bottom end for easy coupling with the second bearing 2.

Specifically, the axial end 12 of the first bearing 1 has a first inner face 121 facing a bottom side of the annular wall 11. The first bearing 1 has an axial hole 13 defined in the axial end 12 and extending through the first inner face 121, such that the partitioning space S can intercommunicate with the outside via the axial hole 13. The shaft 31 of the rotating member 3 extends through the axial hole 13 of the first bearing 1, such that the first axial face 321 of the protruding portion 32 faces the first inner face 121. The shaft 31 has an outer diameter D1 preferably slightly smaller than a hole diameter D3 of the axial hole 13 of the axial end 12 to increase the rotational smoothness of the shaft 31.

Figure 6:
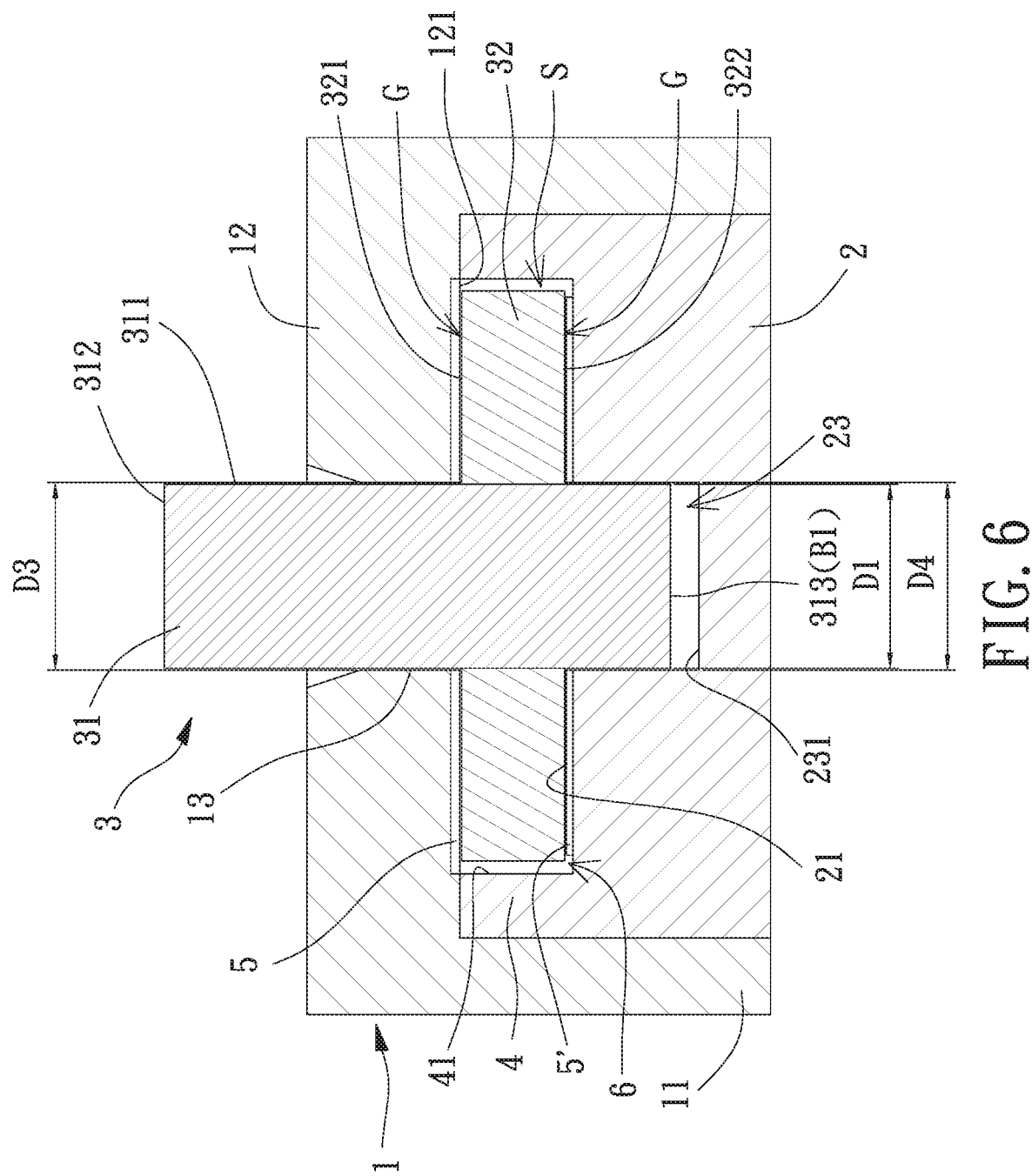
FIG. 6 is a cross sectional view of a bearing system of another embodiment according to the present invention with a supporting portion connected to a second bearing.

Furthermore, the supporting portion 4 can be integrally connected to the first inner face 121 and can protrude below the first inner face 121. When mounting the second bearing 2, the second bearing 2 is pressed until the second inner face 21 abuts against the supporting portion 4 to thereby limit the coupling depth of the second bearing 2. Furthermore, the first inner face 121, the second inner face 21, and an inner periphery 41 of the supporting portion 4 together form the partitioning space S while assuring that the partitioning space S conforms to the predetermined size. Furthermore, the components required to be assembled are few and, thus, can be assembled rapidly. In another embodiment, a reverse arrangement can be provided, such that the supporting portion 4 is integrally connected to the second inner face 21, and when mounting the second bearing 2, the supporting portion 4 abuts against the first inner face 121, as shown in FIG. 6. Alternatively, the supporting portion 4 can be separated into two parts. One of the two parts is integrally connected to the first inner face 121, another of the two parts is integrally connected to the second inner face 21, and the two parts abut against each other during assembly.

With reference to FIGS. 4 and 5 again, the rotating member 3 of this embodiment can be so configured that the protruding portion 32 is located between the outer end face 312 and the inner end face 313 of the shaft 31, such that the rotating member 3 is substantially cruciform in cross section. Thus, the second bearing 2 of this embodiment can further include a compartment 23 recessed in the second inner face 21 and intercommunicating with the partitioning space S. With the simple structure, the bottom portion B1 of the shaft 31 can extend into the compartment 23 and preferably remains in an elevated position not contacting with the bottom face 231 of the compartment 23, such that the shaft 31 will not rub the bottom face 231 during operation. The outer diameter D1 of the shaft 31 is preferably slightly smaller than a diametric width D4 of the compartment 23 to increase the rotational smoothness of the shaft 31.

With reference to FIG. 7 showing a bearing system of a third embodiment according to the present invention, the axial end 12 of the first bearing 1 is located on the bottom side of the annular wall 11 in this embodiment, such that the first bearing 1 has an open top end for easy coupling with the second bearing 2. Furthermore, the rotating member 3 is also substantially cruciform in cross section.

Specifically, the supporting portion 4 of this embodiment can be integrally connected to the second inner face 21 and can protrude below the second inner face 21. When mounting the second bearing 2, the second bearing 2 is pressed until the first inner face 121 abuts against the supporting portion 4 to thereby limit the coupling depth of the second bearing 2. Furthermore, the first inner face 121, the second inner face 21, and an inner periphery 41 of the supporting portion 4 together form the partitioning space S while assuring that the partitioning space S conforms to the predetermined size. Furthermore, the components required to be assembled are few and, thus, can be assembled rapidly. Furthermore, the first bearing 1 of this embodiment can include a compartment 14 recessed in first inner face 121 of the first bearing 1 and intercommunicating with the partitioning space S. Thus, the bottom portion B1 of the shaft 31 can extend into the compartment 14, and the inner end face 313 of the bottom portion B1 of the shaft 31 preferably remains in an elevated position not contacting with a bottom face 141 of the compartment 14. Thus, the shaft 31 will not rub the bottom face 141 during rotation. The outer diameter D1 of the shaft 31 is preferably slightly smaller than a diametric width D5 of the compartment 14 to increase the rotational smoothness of the shaft 31.

Figure 8:
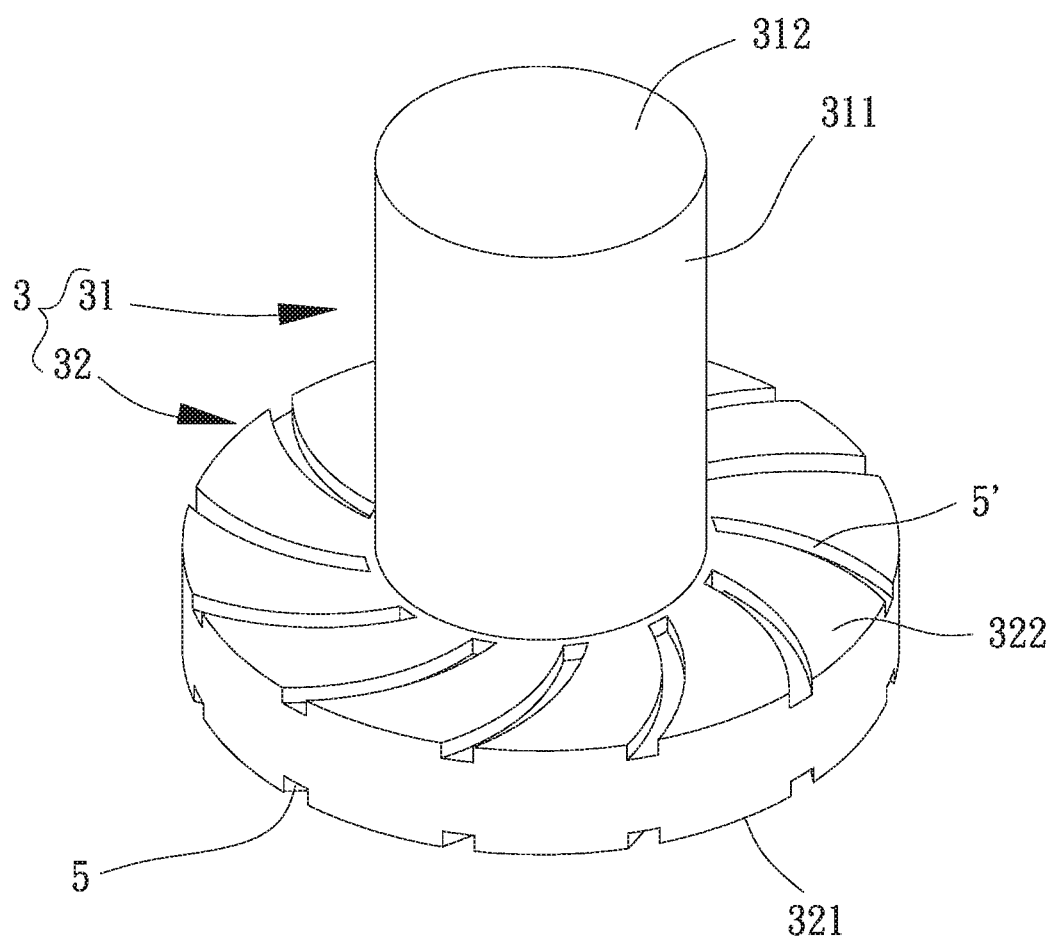
FIG. 8 is a perspective view illustrating a rotating member of another type.

With reference to FIG. 8, in each of the above embodiments, the first axial face 321 of the protruding portion 32 of the rotating member 3 can have the plurality of first dynamic pressure grooves 5, and the second axial face 322 of the protruding portion 32 of the rotating member 3 can have the plurality of second dynamic pressure grooves 5'. The plurality of first dynamic pressure grooves 5 can be axially aligned with or axially misaligned from the plurality of second dynamic pressure grooves 5'. The present invention is not limited in this regard. Namely, in each of the above embodiments, both the inner face 121 of the first bearing 1 and the first axial face 321 of the protruding portion 32 of the rotating member 3 can have the plurality of first dynamic pressure grooves 5, and both the second inner face 21 of the second bearing 2 and the second axial face 322 of the protruding portion 32 of the rotating member 3 can have the plurality of second dynamic pressure grooves 5'. Alternatively, it is also possible that the inner face 121 of the first bearing 1 does not have the plurality of first dynamic pressure grooves 5, and the second inner face 21 of the second bearing 2 does not have the plurality of second dynamic pressure grooves 5'. Namely, only the first axial face 321 of the protruding portion 32 of the rotating member 3 has the plurality of first dynamic pressure grooves 5, and only the second axial face 322 of the protruding portion 32 of the rotating member 3 has the plurality of second dynamic pressure grooves 5'. The above arrangements can be selected and varied by one having ordinary skill in the art and, therefore, should not be limited to the forms illustrated in the figures disclosed in the present invention. In comparison with processing on the first inner face 121 of the first bearing 1 to form the plurality of first dynamic pressure grooves 5, it is easier to process on the first axial face 321 of the protruding portion 32 to form the plurality of first dynamic pressure grooves 5, thereby increasing the processing convenience and efficiency.

Figure 9:
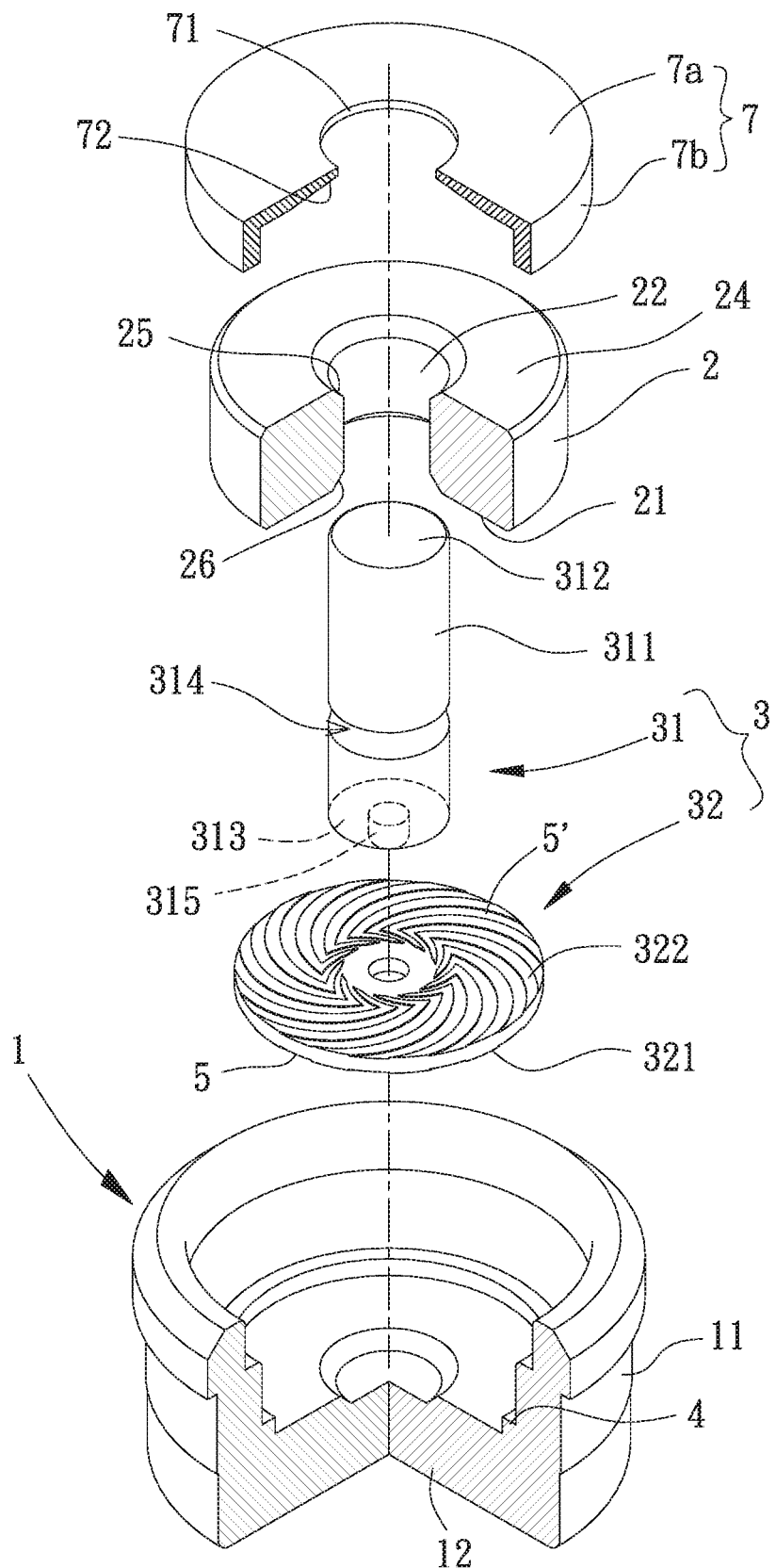
FIG. 9 is an exploded, perspective view of a bearing system of a fourth embodiment according to the present invention.
Figure 10:
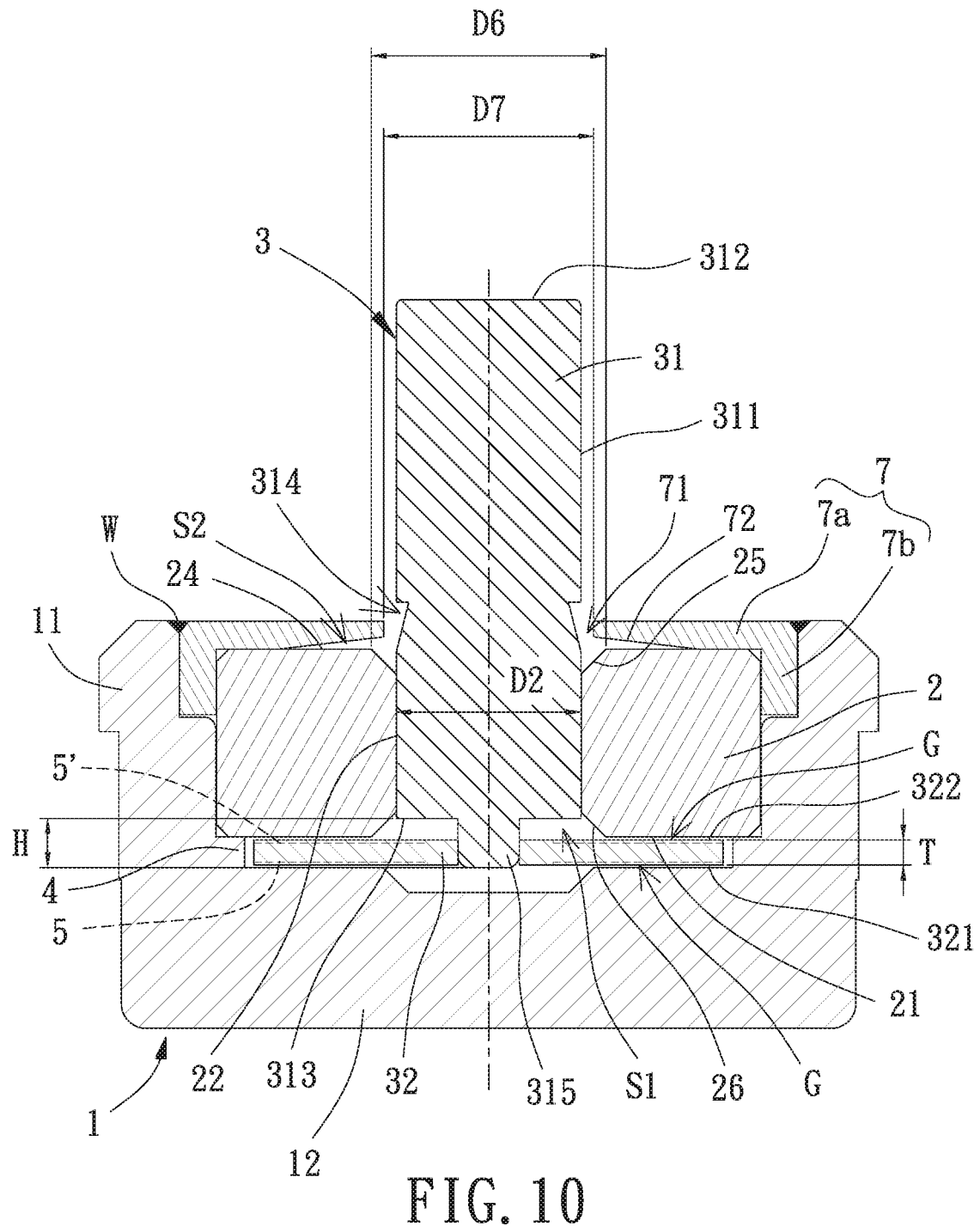
FIG. 10 is a cross sectional view of the bearing system of the fourth embodiment according to the present invention.

With reference to FIGS. 9 and 10 showing a bearing system of a fourth embodiment according to the present invention, the bearing system of this embodiment further includes a ring member 7 for preventing outward flow of the lubricating oil.

Specifically, the second bearing 2 includes an outer face 24 located axially away from the second inner face 21. The second bearing 2 can include a first inclined guiding face 25 and a second inclined guiding face 26. The first inclined guiding face 25 is connected to the axial hole 22 and the outer face 24 of the second bearing 2. A connection area between the first inclined guiding face 25 and the outer face 24 has a diametric width D6. The second inclined guiding face 26 is axially spaced from the first inclined guiding face 25 and is connected to the axial hole 22 and the second inner face 21.

The shaft 31 of the rotating member 3 can include an annular groove 314 annularly formed on the outer periphery 311 of the shaft 31. Thus, when the lubricating oil flows outwards along the outer periphery 311 of the shaft 31, the lubricating oil can flow into the annular groove 314 and then flow back into the first bearing 1 due to the gravity, thereby effectively avoiding loss of the lubricating oil along the shaft 31. The shaft 31 of this embodiment can further include a stub 315 protruding from the inner end face 313 of the shaft 31. The protruding portion 32 can be coupled to or integrally formed with the stub 315 of the shaft 31. A height H of the stub 315 can be larger than a thickness T of the protruding portion 32. Accordingly, the protruding portion 32 is spaced from the inner end face 313 of the shaft 31 to form an oil receiving space S1 between the protruding portion 32 and the inner end face 313, such that the lubricating oil can be more smoothly replenished into the dynamic pressure gap G between the protruding portion 32 and the second inner face 21 of the second bearing 2. Preferably, the inner end face 313 of the shaft 31 is radially aligned with the second inclined guiding face 26, such that the lubricating oil replenishing can be smoother.

In this embodiment, the plurality of first and second dynamic pressure grooves 5 and 5' can be formed on the first axial face 321 and the second axial face 322 of the protruding portion 32, respectively. Furthermore, the plurality of first and second dynamic pressure grooves 5 and 5' can, but not limited to, be V-shaped.

The ring member 7 is coupled to the first bearing 1 and covers the outer face 24 of the second bearing 2 to prevent outflowing of the lubricating oil and to assist in securing the second bearing 2. In this embodiment, the ring member 7 includes a shielding disc 7a and an insertion portion 7b. The shielding disc 7a is substantially in the form of a radially extending disc and has a through hole 71. The shaft 31 extends through the through hole 71. The shielding disc 7a can be radially aligned with the annular groove 314. The through hole 71 has a diametric width D7 larger than a hole diameter D2 of the axial hole 22 of the second bearing 2, such that the shaft 31 will not rub the ring member 7. Furthermore, the diametric width D7 of the through hole 71 is preferably smaller than the diametric width D6 of the connection area between the first inclined guiding face 25 and the outer face 24, such that the ring member 7 can stop the lubricating oil flowing outwards along the first inclined guiding face 25. Furthermore, the shielding disc 7a can include an inclined face 72 contiguous to the through hole 71 and facing the second bearing 2. Thus, the thickness of the shielding disc 7a is gradually reduced towards the through hole 71 to form an oil cutoff space S2 between the inclined face 72 and the outer face 24 of the second bearing 2. Thus, the lubricating oil flowing along the first inclined guiding face 25 to the upper end of the second bearing 2 can continuously flow into the oil cutoff space S2 and is less likely to flow outwards via the through hole 71 of the ring member 7. The insertion portion 7b can be connected to an outer periphery of the shielding disc 7a and substantially extend in the axial direction. Thus, the insertion portion 7b of the ring member 7 can be inserted between the first bearing 1 and the second bearing 2, and the insertion portion 7b can be press-fitted to the annular wall 11 of the first bearing 1. Preferably, laser welding W can be carried out on an outer end of the insertion portion 7b connected to the annular wall 11 of the first bearing 1. Thus, the ring member 7 can be securely coupled to the first bearing while assisting in positioning of the second bearing 2.

In view of the foregoing, in the bearing system according to the present invention, when the rotating member 3 rotates, an oil film can be generated between the protruding portion 32 and each of the first and second bearings 1 and 2 due to the dynamic pressure. The oil films not only maintain smooth rotation of the shaft 31 but also prevent axial displacement of the shaft 31 as well as preventing the protruding portion 32 from impacting the first and second bearings 1 and 2 to thereby avoid operational noise and vibrations. The quality of a fan or a motor equipped with the bearing system can, thus, be improved.

It is worth mentioning that the bearing system according to the present invention can be assembled in advance to permit rapid subsequent assembly to a base of the fan or motor. Furthermore, the shaft 31 of the rotating member 3 can be coupled to a rotor of the fan or motor to increase the assembling efficiency of the fan or motor.

Although the invention has been described in detail with reference to its presently preferable embodiments, it will be understood by one of ordinary skill in the art that various modifications can be made without departing from the spirit and the scope of the invention, as set forth in the appended claims

What is claimed is:

1. A bearing system comprising:
   a first bearing which is hollow and has a first inner face;
   a second bearing located in the first bearing, wherein the second bearing includes a second inner face axially aligned with the first inner face, and wherein a partitioning space is formed between the first inner face and the second inner face; and
   a rotating member including a shaft and a protruding portion coupled to the shaft, wherein the protruding portion is located in the partitioning space, wherein a dynamic pressure gap is formed between the protruding portion and the first inner face during rotation, and wherein another dynamic pressure gap is formed between the protruding portion and the second inner face during rotation;
   wherein the second bearing includes an outer face located axially away from the second inner face, and wherein a ring member is coupled to the first bearing and covers the outer face of the second bearing;
   wherein the ring member includes a shielding disc having a through hole, wherein the shaft extends through the through hole of the shielding disc and an axial hole of the second bearing, and wherein the through hole has a diametric width larger than a hole diameter of the axial hole of the second bearing; and
   wherein the shaft includes an inner end face located in the first bearing, wherein a stub protrudes from the inner end face, wherein the protruding portion is coupled to the stub, wherein the stub has a height larger than a thickness of the protruding portion, and wherein an oil receiving space is formed between the protruding portion and the inner end face.

2. The bearing system as claimed in claim 1, further comprising a supporting portion located between the first inner face and the second inner face, wherein the partitioning space is formed between the first inner face, the second inner face, and an inner periphery of the supporting portion.

3. The bearing system as claimed in claim 2, wherein the shaft extends through an axial hole of the second bearing, wherein the first bearing includes an annular wall connected to an axial end, wherein the first inner face is located on the axial end and faces the axial hole, and wherein the supporting portion is integrally connected to one of the first and second inner faces and abuts against another of the first and second inner faces.

4. The bearing system as claimed in claim 3, wherein the shaft has an outer diameter smaller than a hole diameter of the axial hole of the second bearing.

5. The bearing system as claimed in claim 3, wherein the first inner face of the first bearing is recessed to form a compartment intercommunicating with the partitioning space, and wherein the shaft has a bottom portion extending into the compartment and remaining in an elevated position not contacting with a bottom face of the compartment.

6. The bearing system as claimed in claim 5, wherein the outer diameter of the shaft is smaller than a diametric width of the compartment.

7. The bearing system as claimed in claim 2, wherein the first bearing includes an annular wall connected to an axial end, wherein the first inner face is located on the axial end, wherein the axial end has an axial hole extending through the first inner face, wherein the shaft extends through the axial hole of the axial end, and wherein the supporting portion is integrally connected to one of the first and second inner faces and abuts against another of the first and second inner faces.

8. The bearing system as claimed in claim 7, wherein the shaft has an outer diameter smaller than a hole diameter of the axial hole of the axial end.

9. The bearing system as claimed in claim 7, wherein the second inner face of the second bearing is recessed to form a compartment intercommunicating with the partitioning space, and wherein the shaft has a bottom portion extending into the compartment and remaining in an elevated position not contacting with a bottom face of the compartment.

10. The bearing system as claimed in claim 9, wherein the outer diameter of the shaft is smaller than a diametric width of the compartment.

11. The bearing system as claimed in claim 1, wherein a bottom end of the shaft is flush with a bottom end of the protruding portion.

12. The bearing system as claimed in claim 1, wherein the shaft includes an outer periphery, an outer end face, and an inner end face, and wherein the protruding portion is located between the outer end face and the inner end face of the shaft.

13. The bearing system as claimed in claim 1, wherein the first bearing includes an annular wall, and wherein the second bearing is press-fitted to the annular wall of the first bearing.

14. The bearing system as claimed in claim 1, wherein the first bearing includes an annular wall, and wherein the second bearing is coupled to the annular wall by laser welding.

15. The bearing system as claimed in claim 1, wherein the protruding portion is integrally formed with an outer periphery of the shaft and extends radially outwards from the outer periphery of the shaft.

16. The bearing system as claimed in claim 1, wherein the protruding portion is coupled to an outer periphery of the shaft and extends radially outwards from the outer periphery of the shaft.

17. The bearing system as claimed in claim 16, wherein the protruding portion is coupled to outer periphery of the shaft by laser welding.

18. The bearing system as claimed in claim 1, wherein the protruding portion is in a form of a disc and encircles an outer periphery of the shaft.

19. The bearing system as claimed in claim 1, wherein the first bearing and the second bearing are made of phosphor bronze alloy.

20. The bearing system as claimed in claim 1, wherein the protruding portion includes a first axial face aligned with the first inner face of the first bearing, wherein at least one of the first inner face and the first axial face is recessed to form a plurality of first dynamic pressure grooves, wherein the protruding portion includes a second axial face aligned with the second inner face of the second bearing, and wherein at least one of the second inner face and the second axial face is recessed to form a plurality of second dynamic pressure grooves.

21. The bearing system as claimed in claim 20, further comprising at least one annular grooves surrounding and intercommunicating with at least one of the plurality of first dynamic pressure grooves and the plurality of second dynamic pressure grooves.

22. The bearing system as claimed in claim 1, wherein the second bearing includes a first inclined guiding face connected to the axial hole and the outer face of the second bearing, and wherein the diametric width of the through hole is smaller than a diametric width of a connection area between the first inclined guiding face and the outer face.

23. The bearing system as claimed in claim 1, wherein the shaft includes an annular groove radially aligned with the shielding disc.

24. The bearing system as claimed in claim 1, wherein the shielding disc includes an inclined face contiguous to the through hole and facing the second bearing, and wherein an oil cutoff space is formed between the inclined face and the outer face of the second bearing.

25. The bearing system as claimed in claim 1, wherein the ring member includes an insertion portion connected to an outer periphery of the shielding disc, wherein the insertion portion extends between the first bearing and the second bearing, and wherein the insertion portion is coupled with the first bearing.

26. The bearing system as claimed in claim 1, wherein the second bearing includes a second inclined guiding face connected to the axial hole and the second inner face, and wherein the inner end face of the shaft is radially aligned with the second inclined guiding face.

\* \* \* \* \*